Dec. 3, 1968    W. HODGES, JR., ET AL    3,414,072
VEHICLE CAPABLE OF ARTICULATING ABOUT
ROLL, PITCH, AND YAW AXES
Filed Sept. 16, 1965    7 Sheets-Sheet 1
FIG_1
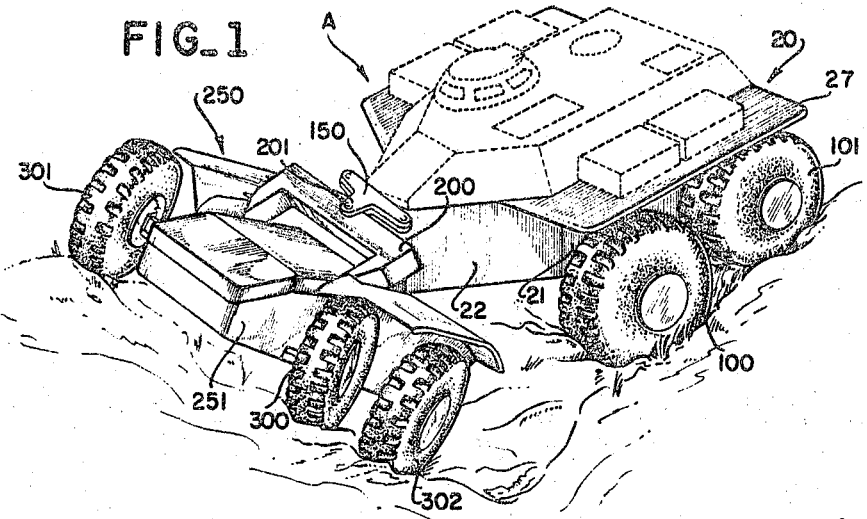
FIG_1a
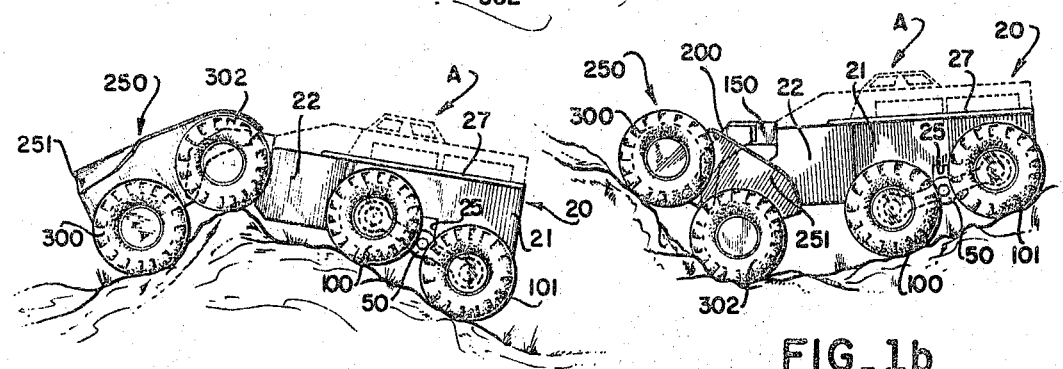
FIG_1b
FIG_1c
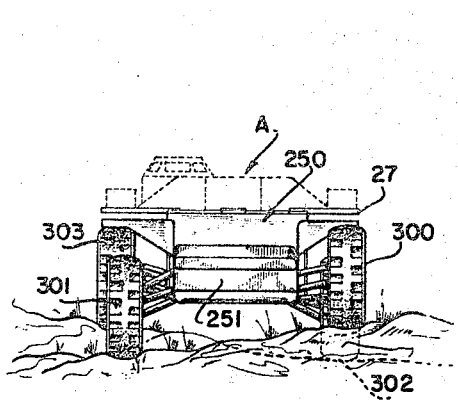
FIG_1d
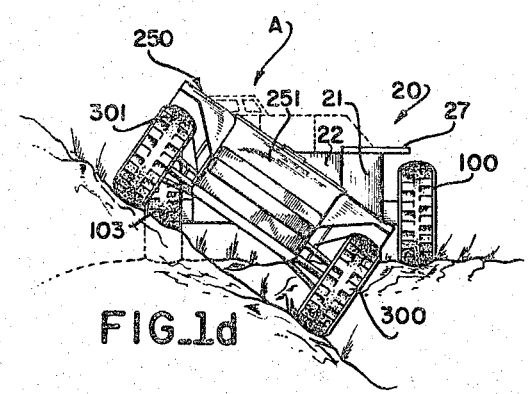
INVENTORS.
WETMORE HODGES, JR.
RALPH R. ROESKY
BY George C. Sullivan
Agent

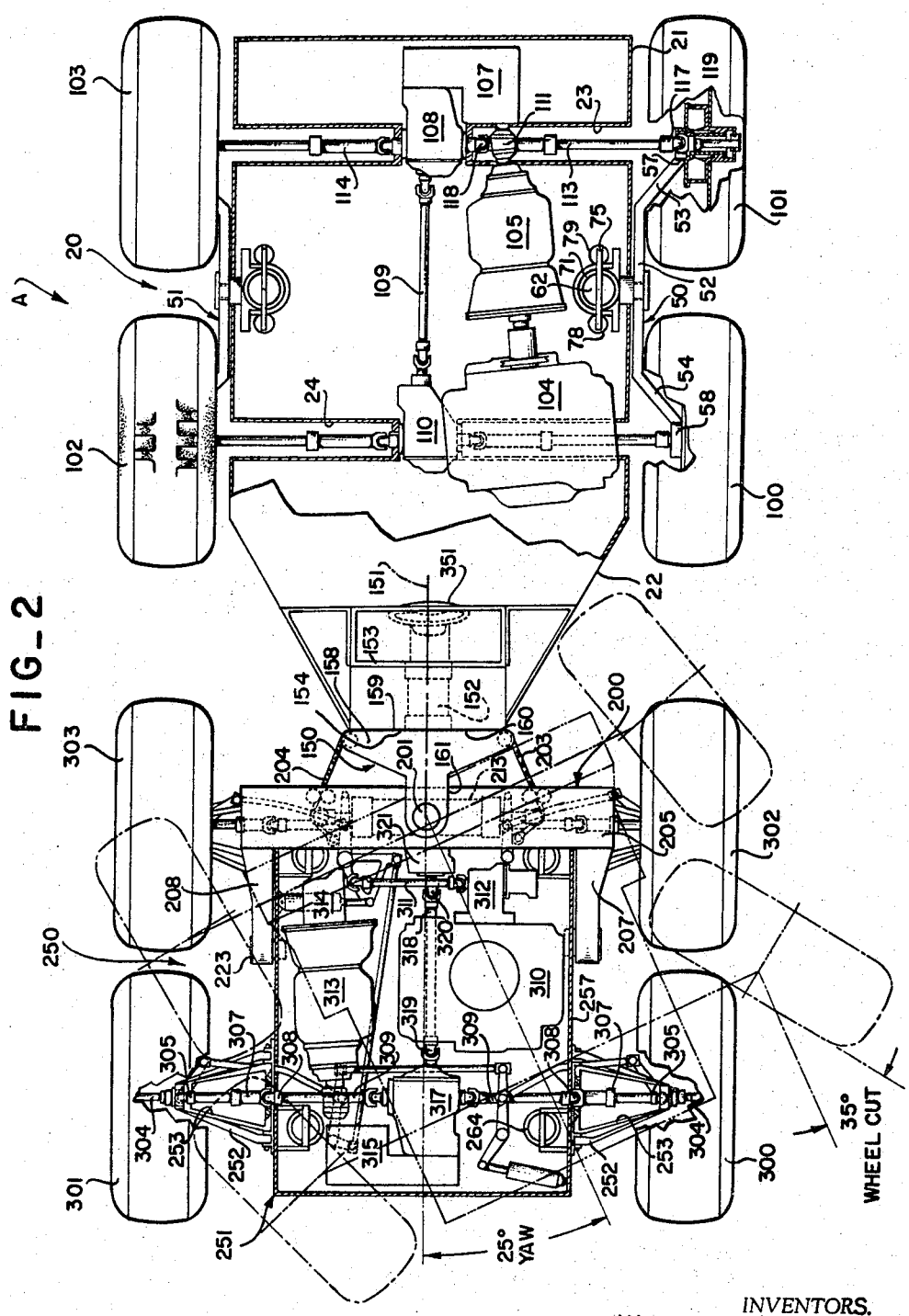

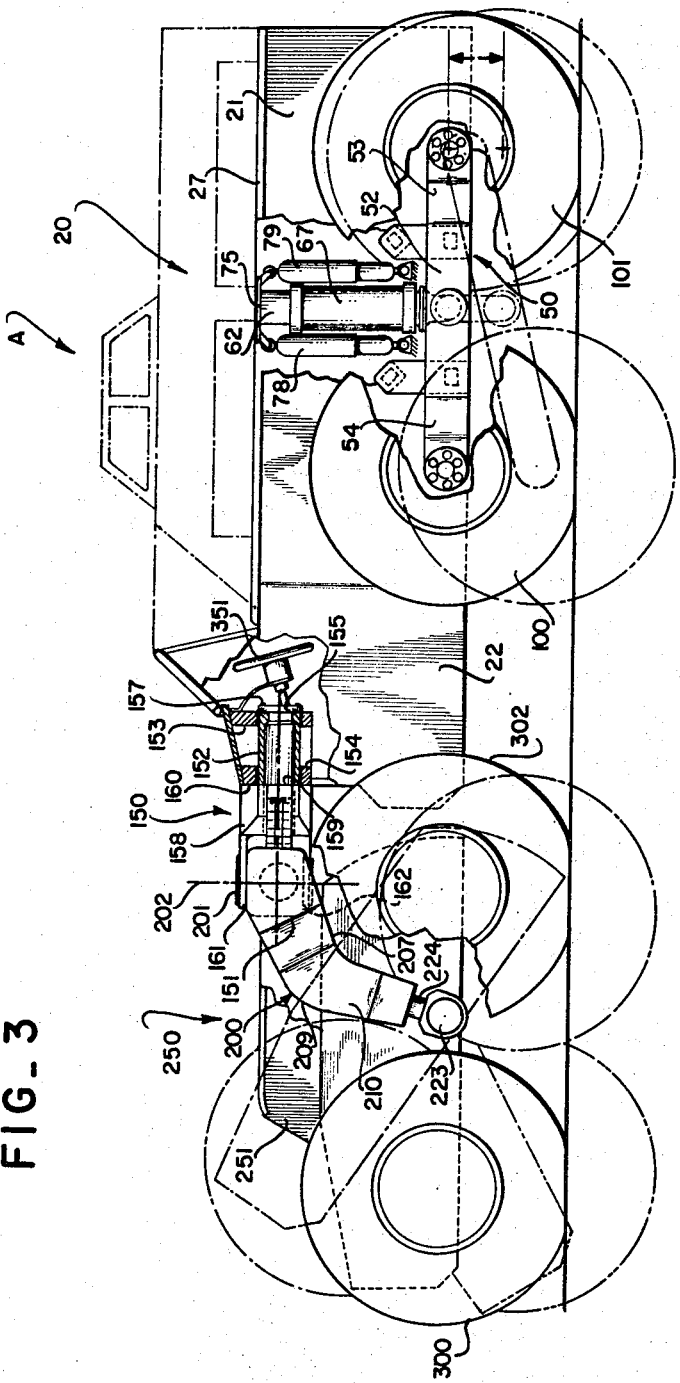

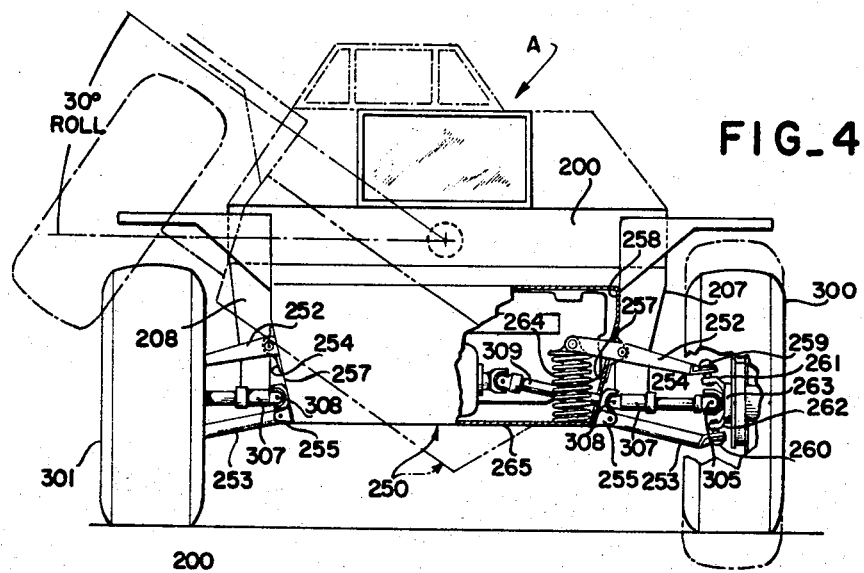
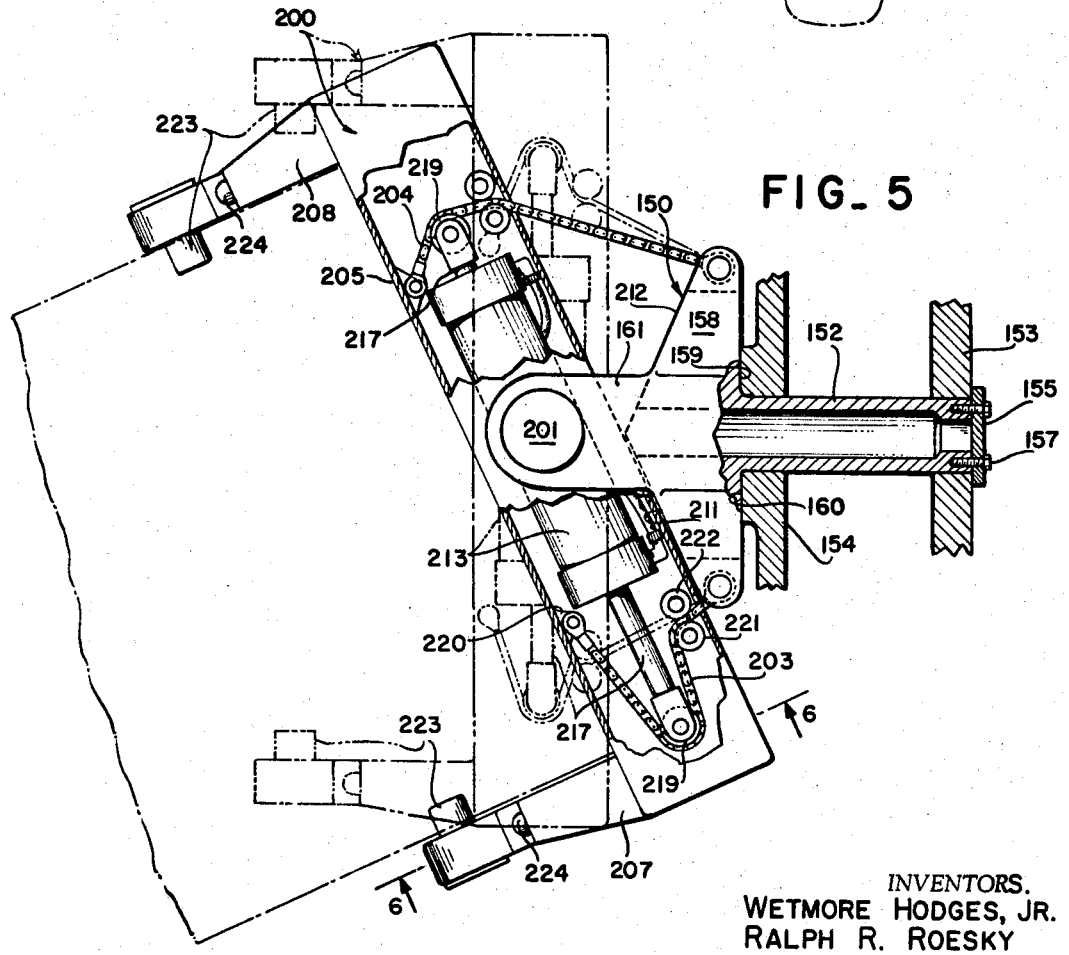
INVENTORS.
WETMORE HODGES, JR.
RALPH R. ROESKY
BY *George L. Sullivan*
Agent

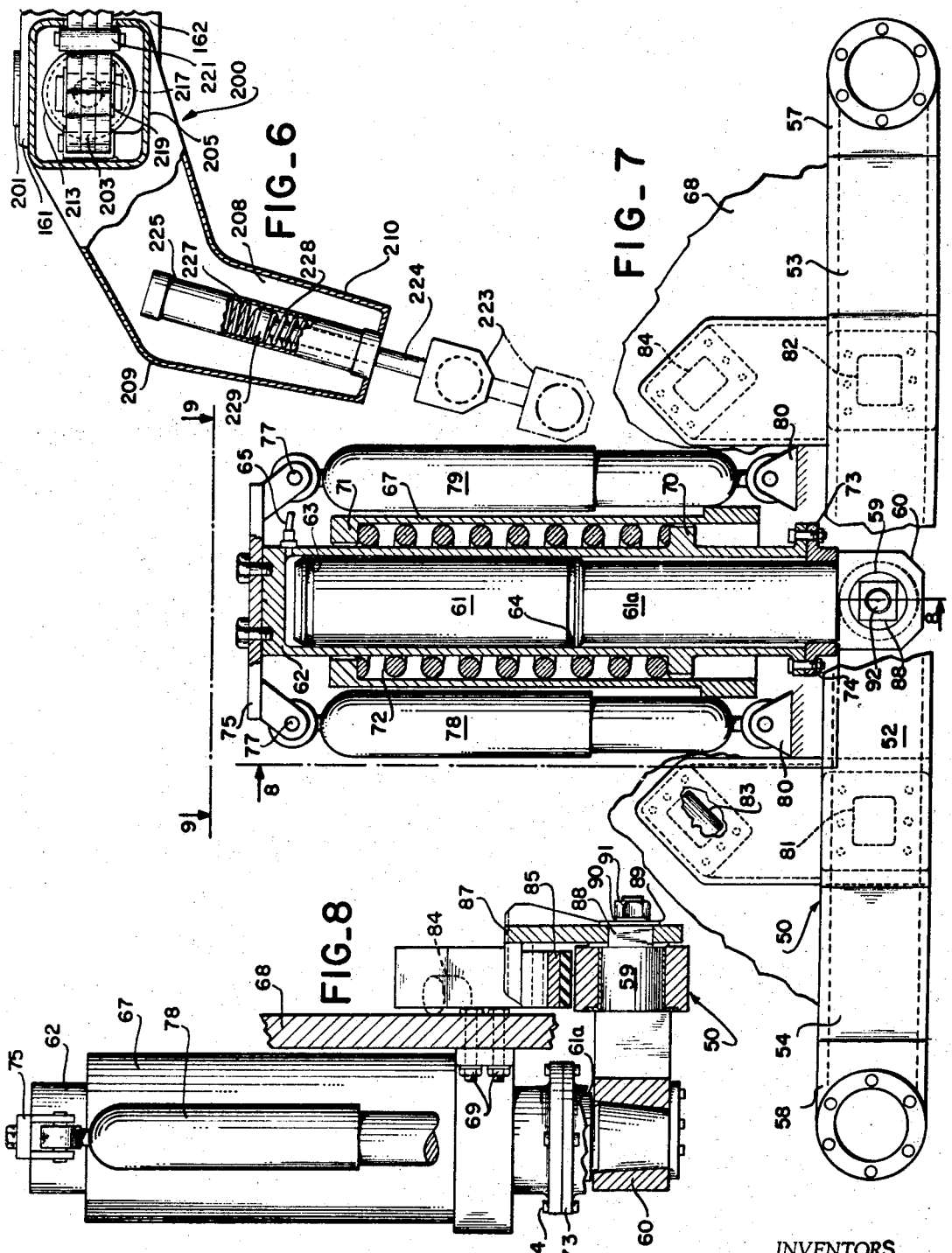

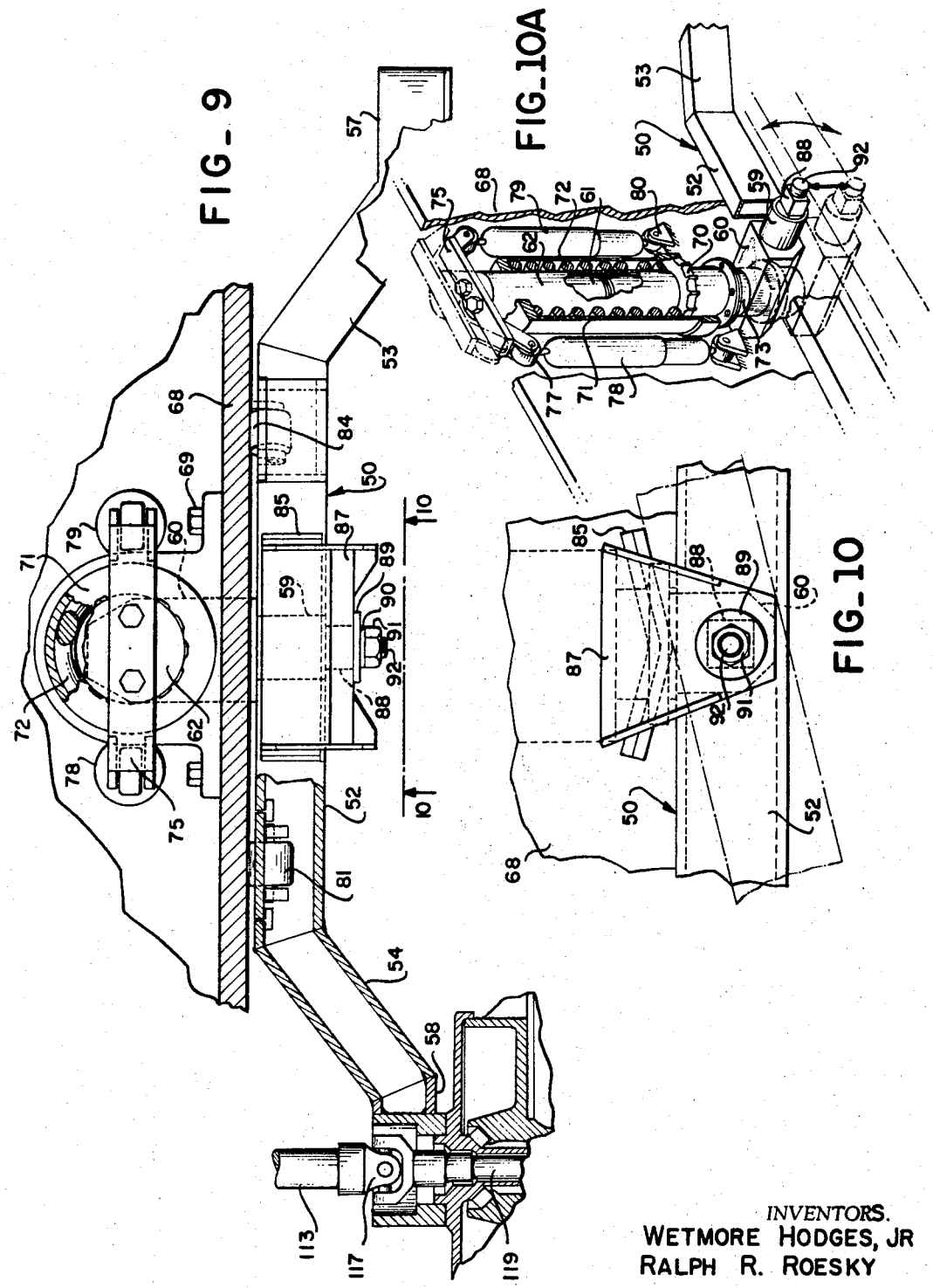

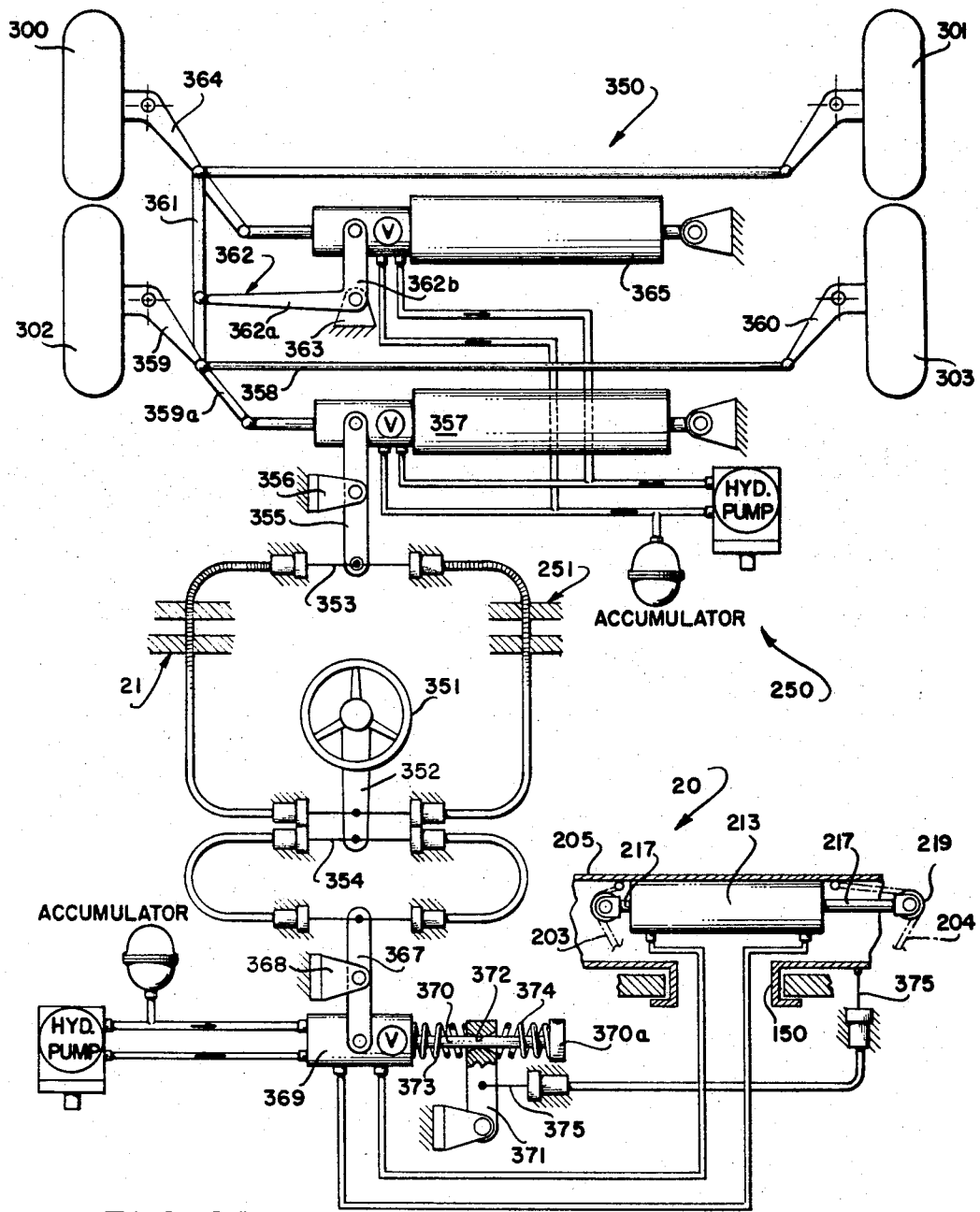

United States Patent Office 3,414,072
Patented Dec. 3, 1968

3,414,072
VEHICLE CAPABLE OF ARTICULATING ABOUT
ROLL, PITCH, AND YAW AXES
Wetmore Hodges, Jr., Menlo Park, and Ralph R. Roesky,
Los Altos, Calif., assignors to Lockheed Aircraft Corporation, Burbank, Calif.
Filed Sept. 16, 1965, Ser. No. 487,675
20 Claims. (Cl. 180—51)

ABSTRACT OF THE DISCLOSURE

A highly maneuverable wheeled vehicle consisting of a rear "truck" member having two pairs of wheels mounted on a walking beam, and a front "truck" attached to the rear truck in a highly articulate manner providing for relative movement on pitch, yaw, and roll axes simultaneously.

---

The present invention relates to ground vehicles, and pertains more particularly to a vehicle which is so articulated and constructed that the support wheels of the vehicle tend to remain in load bearing relation with the ground over which the vehicle travels, even on rough terrain.

In some industries, for example, oil well and other types of exploration, and for military use, the availability of a vehicle which is highly maneuverable, rugged, and capable of high speed and relatively stable operation even over rough terrain is highly desirable.

In the past, many developments have been made directed toward the provision of such a vehicle, including tracked or crawler type vehicles, four-wheel-drive vehicles, and various combinations thereof.

A primary object of the present invention is to provide a vehicle having separate front and rear units which are interconnected for relative articulated motion which vehicle is capable not only of high speed highway travel, but also of comparatively high speed off-highway travel over rough terrain that is impassable to prior vehicles. An additional object of the invention is to provide a vehicle which will permit military utilization over rough terrain at speeds unattainable by previous vehicles, a factor which is quite important in war-time operations since a moving target is much more difficult to hit than a stationary one.

A further object of the invention is to produce a vehicle which has improved "ride" and comfort qualities in rough terrain and which reduces or eliminates "back-track" and lost time. It is to be emphasized that location of operating personnel in an area of the vehicle where acceleration forces are minimized contributes to personnel safety and comfort and therefore vehicle performance.

Another object of the invention is to provide a vehicle having a multi-wheel-supported front unit, and a multi-wheel-supported rear unit, the support wheels of each unit being capable of substantial pitch adjustment, the units being interconnected and controlled for articulated motion or adjustment, including adjustment about a longitudinal axis.

As used herein the term "adjustment" is understood to include "automatic" movement of the component major elements of the vehicle brought about by passage over terrain irregularities.

A further object of the invention is to provide a vehicle having a front unit and a rear unit interconnected by an articulated structure whereby the front unit is free for substantial forward and rearward pitch adjustment, and for twisting adjustment about a longitudinal axis relative to the rear unit, the support means of one of the units being dirigible, and the units being interconnected for controlled, relative turning movement synchronously with steering movements of the dirigble support means.

A further object of the invention is to provide an improved, articulated vehicle which is rugged, highly maneuverable, fast, and capable of operation over extremely rough terrain.

A further object of the invention is to provide a vehicle which is at least partially supported on a walking beam structure, and wherein the walking beam structure is vertically adjustable relative to other portions of the vehicle.

A still further object is to provide an improved vehicle which uses a substantial number of standard automotive parts, and which conforms to a significant extent to standard automotive practices.

The foregoing objects and advantages of the invention will be apparent from the following description and the accompanying drawings, wherein:

FIG. 1 is a perspective view of an illustrative vehicle embodying the invention as it appears when operating over rough terrain.

FIGS. 1a and 1b are side elevational views showing the vehicle illustrated in FIG. 1 with the front and rear units thereof subjected to pitch adjustment to conform to terrain over which the vehicle is operating.

FIG. 1c is a front elevational view of the vehicle showing the spring suspended wheels of the front unit in vertically displaced condition.

FIG. 1d is a front elevational view showing the front and rear units in twisted adjustment about a longitudinal axis.

FIG. 2 is an enlarged, top plan view of the vehicle shown in the preceding views, portions being broken away to disclose the power drive mechanism, the broken lines showing the front unit at its limit of left hand turning movement, and its dirigible wheels turned for a conforming left-hand turning movement.

FIG. 3 is a similarly enlarged, side elevational view of the same vehicle, portions thereof being broken away to show the mounting structure for the roll tube and steering yoke pivot fitting, the broken lines showing the wheels of both units in various attitudes of pitch adjustment.

FIG. 4 is a front elevational view of the vehicle to the same scale as FIG. 3, portions being broken away to show the suspension and drive mechanism of one of the dirigible wheels of the front unit, the dash-one-dot lines at the right of this view indicating up and down movements of the wheels relative to the body; and the dash-two-dot lines at the left of this view showing the front unit displaced through a roll angle of 30° clockwise relative to the rear unit as viewed from the front of the vehicle.

FIG. 5 is an enlarged, fragmentary, top plan view of the roll tube and steering yoke pivot fitting with the steering fork pivotally mounted thereon, portions being broken away, the solid lines showing the steering fork in its maximum turned position for making a left turn, and the broken lines showing the steering fork in its straight-ahead position.

FIG. 6 is a sectional view taken along line 6—6 of FIG. 5, the broken lines showing one of the trunnion blocks in extended position.

FIG. 7 is an enlarged, fragmentary, side elevational view of one of the walking beams and its associated spring suspension and hydraulic extension mechanism in fully bottomed condition, portions being broken away.

FIG. 8 is a sectional view taken along line 8—8 of FIG. 7.

FIG. 9 is a fragmentary, sectional view taken along line 9—9 of FIG. 7, portions being broken away, a wheel axle drive connection being shown in diametrical section.

FIG. 10 is a fragmentary view taken along line 10—10 of FIG. 9.

FIG. 10a is a fragmentary, perspective view in reduced scale of one of the walking beam suspension and hydraulic extension mechanisms.

FIG. 11 is a diagram of the hydraulic steering mechanism for the vehicle shown in FIGS. 1–10.

BRIEF DESCRIPTION

Briefly, in the illustrative embodiment of the invention, a vehicle A comprises a rear unit 20 having a box-like body 21 with two similar spring-mounted walking beams 50 and 51 mounted one on each side thereof, each walking beam having two power driven support wheels mounted one at each end thereof, wheels 100 and 101 being mounted on the left hand walking beam 50, and wheels 102 and 103 being mounted on the right hand walking beam 51.

A combined roll tube and steering yoke pivot fitting 150 is pivotally mounted on the tapered forward end of the rear body 21 for twisting movement about a longitudinal roll axis 151 (FIGS. 3 and 4). A steering fork 200 is pivotally mounted on a pivot pin 201 in the forward end of the fitting 150 for turning movement about a generally upright axis 202.

Steering chains 203 and 204 (FIG. 5) are tensioned by hydraulic means 213 as required to control turning movement of the steering fork 200 about its pivot pin 201.

A front unit 250 comprises a box-like body 251 which is trunnioned between the lower ends of the arms of the steering fork 200, and is free for pitch adjustment therein within the limits imposed by the steering fork. The front unit 250 is supported on four independent, spring suspended, power driven, dirigible wheels 300, 301, 302, and 303, which are steered by generally conventional automotive type power steering mechanisms 350 (FIG. 11) preferably synchronously with pivotal movements of the steering fork 200, as will be brought out later herein.

Separate power drive mechanisms for each of the two units of the illustrative vehicle A are generally similar, that for the rear unit 20 comprising an internal combustion engine 104 (FIG. 2) which drives the rear unit wheels 100, 101, 102, and 103 through an automotive type automatic transmission 105, a gear box 107, a rear differential gear unit 108, a drive shaft 109, a front differential gear unit 110, and telescopic universal jointed axle shafts, one to each of the support wheels.

DETAILED DESCRIPTION

*Rear unit.*—Referring to the drawings in greater detail, the body 21 of the rear unit 20 of the illustrative vehicle A is of conventional construction. The forward portion 22 of the rear unit body 21 is tapered forwardly to provide clearance for the rear wheels 302 and 303 of the front unit 250 in making an extreme turn in either direction as shown in broken lines in FIG. 2. A pair of downwardly open channels 23 and 24 (FIG. 2) are formed in the under side of the rear unit body 21 to provide clearance for the axle drive shafts of the rear unit support wheels, to be described later herein, and a notch 25 (FIGS. 1a and 1b) is provided on each side of the body to provide clearance for the walking beam suspension mechanism. A fender plate 27 extends outwardly over the support wheels on each side of the rear unit 20 to arrest mud, dirt and other material thrown upwardly by the wheels.

*Support means.*—The illustrative vehicle A is shown with its front unit supported on four dirigible automotive type wheels, and its rear unit supported on four non-dirigible wheels of the same general type. It will be obvious to those familiar with the engineering and design of power driven vehicles that other types of support means can readily be employed for vehicles embodying the present invention, such as, for example, tracks, air bags, rollers, etc. The provision of support means of a type best suited for the uses to which a vehicle to be put is, therefore, a matter of selection and design in each case, and the term "wheels" herein includes such support means.

*Walking beams.*—The two walking beams 50 and 51 are identical but reversed, so that only the one 50 will be described in detail herein. As best shown in FIGS. 2, 3 and 7–10, the walking beam 50 is of rectangular, tubular construction, with a straight central portion 52, outwardly inclined intermediate portions 53 and 54, and forwardly and rearwardly extending end portions 57 and 58.

The support wheels 100 and 101 are journaled, one on each end of the walking beam 50, as shown, for example, at the right hand side of FIG. 2, and at the left hand side of FIG. 9. The mounting of such independently driven support wheels is well known in the automotive industry, and since their mounting is not, per se, a feature of the present invention, the details thereof are omitted herein.

The walking beam 50 is journaled medially of its length on a bearing boss 59 (FIG. 8) provided on the outer end of a block 60 secured to the lower end of the piston 61 of a hydraulic cylinder 62. Clearance for vertical movement of the walking beam mounting block 60 is provided by the notch 25 (FIGS. 1a and 1b) in the lower edge of the associated side plate of the rear unit body 21. Each hydraulic piston 61 is fitted into its spring-mounted hydraulic cylinder 62, and is sealed thereto by a usual O-ring 63. A dust ring 64 is also preferably provided on the piston 61 to wipe the cylinder wall ahead of the O-ring 63. A conventional line 65 for pressurized hydraulic liquid opens into the cylinder 62, and is operatively connected in a conventional manner to a usual hydraulic pump and accumulator to maintain desired hydraulic pressure on the piston 61.

The hydraulic cylinder 62 is mounted for axial slidable movement in a cylindrical housing 67, which is fixedly attached to the inner side of the rear unit body side plate 68 by bolts 69 (FIGS. 8 and 9). The hydraulic cylinder 62 is guided for axial movement in the housing 67 by a peripherally notched annular flange 70 formed on the cylinder 62, and by an inwardly extending, similarly notched flange 71 in the upper end of the cylindrical housing 67.

A support spring 72 is held in compression between the flanges 70 and 71 to exert a downward, resilient supporting force on the hydraulic cylinder 62 and thence on the walking beam 50 mounted on its lower end. A flanged cylinder head 73 is secured by bolts 74 to the flanged lower end of the hydraulic cylinder 62, and provides slidable, guiding support for a lower piston portion 61a of reduced diameter. The lower cylinder head 73 also acts as an upward limit stop for the block 60 as shown in FIG. 7. Ground clearance of the rear unit body 21 can be increased by the introduction of pressurized hydraulic liquid into the cylinder 62 to extend the piston 61, and thereby raise the cylinder 62 and the structure supported thereby.

A shock absorber connecting bar 75 is secured across the top of the hydraulic cylinder 62, and is connected by pins 77 to the upper ends of a pair of conventional automotive type shock absorbers 78 and 79. The lower ends of the shock absorbers are similarly connected to brackets 80 which are secured to the body side plate 68.

A first lower pair of guide rollers 81 and 82 (FIGS. 7 and 9) are journaled in the straight, central portion of the walking beam 50, one forwardly and one rearwardly of its central connection to the boss 59, while a second, generally similar pair of guide rollers 83 and 84 are journaled in a pair of box-like upward extensions of each walking beam, one above each of the lower rollers 81 and 82. All four of these rollers have rolling engagement with the outer face of the body side plate 68 to guide the walking beam during the latter's pivotal and up-and-down movements relative to the body 21.

A shallow, V-shaped limit stop plate 85 is welded edgewise to a sturdy metal plate member 87, which has a square hold therein to receive, in fitted relation, a square outward projection 88 (FIGS. 8–10) provided on the walking beam support block 60. The member 87 is secured in position on its support by a washer 89, lock washer 90, and nut 91, the latter being screwed onto a threaded stud 92 projecting outwardly beyond the square projection 88. The V-shaped stop plate 85 is positioned directly over the straight central portion 52 of its associated walking beam 50 as shown in FIG. 9, and as indicated in FIG. 10, limits the pitch angle displacement of the walking beam.

*Drive mechanism, rear unit.* —The drive mechanism for the rear unit 20 comprises the internal combustion engine 104, which is mounted in the rear unit body 21 and is coupled directly to the power input end of the conventional automatic transmission 105. The power output end of the automatic transmission 105 is coupled by a flexible coupling 111 to the gear box 107.

The power output end of this gear box drives the rear differential gear unit 108, and through the drive shaft 109 the forward differential gear unit 110. All of the differential gear units of the vehicle A preferably are of the limited-slip type, so that in the event one of the driven support wheels loses traction, its opposite wheel will still be operable to propel the vehicle.

Each differential drive mechanism of the rear unit 20 is coupled, by a pair of telescoping, splined shafts, such as those 113 and 114, and universal joints such as those 117 and 118 to the driven axles 119 (FIGS. 2 and 9) of a pair of laterally opposite support wheels.

Since all of the various mechanisms employed in the power drive trains of both the forward and rearward units of the illustrative vehicle A are well known and conform to general automotive practice, and since the structure, mounting and operation of these elements will be readily apparent to those familiar with such practice, the details thereof are omitted.

*Roll tube and steering fork pivot fitting.* —The roll tube and steering fork pivot fitting 150 comprises a tubular portion 152 which is pivotally mounted in axially aligned holes provided therefor in a pair of transverse plates 153 and 154. The latter are embodied as integral units in the tapered forward portion 22 of the rear unit body 21. As shown, the tubular portion 152 is journaled so that its roll axis is substantially parallel to the ground when the vehicle A is on a level surface. However, if desired, this roll tube portion can be mounted with the rearward end of its roll axis tilted downward if a caster effect is desired. A circular retaining plate 155 is secured coaxially to the rear end of the tubular portion 152 by suitable means such as studs 157.

The forward end of the tubular portion 152 is connected firmly, and substantially integrally, to a cross-head portion 158, which may be a steel forging or conventional welded plate construction. A bearing surface 159 (FIG. 5) is provided on the rear face of the cross-head portion 158, and bears against a corresponding surface 160 provided therefor on the forward face of the front plate 154 of the rear unit body 21. A pair of pivot pin support plates 161 and 162 extend forwardly from the top and bottom, respectively, of the center of the cross-head portion 158, and are provided with axially aligned holes to receive the stering fork pivot pin 201.

*Steering fork and its actuating mechanism.*—The steering fork 200, which is fitted for pivotal movement on the pivot pin 201, is of conventional, welded steel plate construction, and comprises a straight, generally rectangular upper portion 205, and a pair of downwardly and forwardly extending, similar side arms 207 and 208. Each of the side arms has a bend 209 substantially medially of its length, so that the lower portion 210 of each steering fork arm 207 and 208 below the bend 209 therein is inclined slightly rearwardly from the vertical, as best shown in FIGS. 3 and 6. The transverse, straight upper portion 205 of the steering fork 200 is limited in its freedom for pivotal movement, as best shown in FIG. 5, by the outwardly and rearwardly inclined forward faces 211 and 212 of the cross-head portion 158 of the fitting 150.

Pivotal movement of the steering fork 200 about its pivot pin 201 may be accomplished by the controlled actuation of a double acting hydraulic cylinder 213 (FIGS. 2, 5, and 6 fixedly mounted with its axis disposed longitudinally within the transverse upper portion 205 of the steering fork. The hydraulic cylinder 213 is provided with a piston rod 217 which projects from both ends of the cylinder and has a roller 219 journaled on each end thereof. These rollers are in rolling, thrust engagement with their respective steering chains 203 and 204.

Since the actuating mechanism for both steering chains are similar, only that for the left hand one 203 will be described in detail. The forward end of the steering chain 203 is anchored to a bracket 220 provided therefor on the inner side of the forward wall of the transverse upper portion 205 of the steering fork 200, while the rearward end of this chain is anchored to the outer end of the cross-head portion 158 of the roll tube fitting 150. The steering chain 203 passes through an opening provided therefor in the rear wall of the portion 205 of the steering fork 200, and a pair of guide rollers 221 and 222 are mounted interiorly of the opening to provide rolling, guiding support for the steering chain during a steering actuation thereof by the hydraulic cylinder 213. If desired, spring biased tensioning means may be provided for each of the steering chains 203 and 204 to take up slack when the chains are not subjected to tensile stress. Since the provision of such means is within the capability of any routine designer, and it is not, per se, material to the invention, it is omitted.

When the opposite end portions of the piston rod 217 of the hydraulic fork control cylinder 213 are in equally extended condition, as shown in broken lines in FIG. 5, the steering fork 200 is in its straight ahead condition. To induce a pivotal movement of the steering fork 200 in one direction or the other about its pivotal axis 202, the hydraulic cylinder is actuated to extend one end of the piston rod in a desired direction while the other is retracted as shown in solid lines in FIG. 5. Selective operation of the hydraulic cylinder 213 is provided by hydraulic control means as shown in FIG. 11, and to be described herein later. It will be obvious to those familiar with the principles of automotive design that the actuation of the stering fork 200 by the steering chains 203 and 204 must be co-ordinated with, or subservient to the steering movements of the dirigible wheels of the vehicle.

Though not shown in the drawings, it should be understood that the hydraulic cylinder 213 may be provided with a by-pass valve having a variable orifice which obviously would allow fluid from either end of the cylinder to pass through the orifice to a controllably variable extent, thus resulting in a dampening action to facilitate the absorption of shocks as the vehicle traverses rough terrain or as the wheels of the vehicle encounter obstacles.

In like manner such a hydraulic dampener mechanism could be provided in connection with the articulation of the front and rear parts of the vehicle around the other two degrees of freedom of movement, i.e., to dampen the shocks encountered as the front body would rotate with respect to the rear body, and the rotation which might be affected of the front body unit about the pivot points in trunnion block 223.

A trunnion block 223 for mounting the front unit 250 in the steering fork is mounted on the lower end of a rod 224, which is mounted for axial movement in a housing 225 provided therefor in the lower portion 210 of each arm 207 and 208 of the steering fork. Suitable resilient suspension is provided for each rod 224, and as illustrated, comprises a pair of springs 227 and 228 held in compression between a head 229 provided on each trunnion block support rod 224 and opposite ends of the housing 225. The specific type of spring suspension employed for the trunnion blocks 223 is not, however, a primary feature of the present invention.

*Front unit.*—The trunnion blocks 223 are pivotally connected co-axially to opposite sides of the body 251 of the front unit 250, on an axis perpendicular to and slightly rearwardly of the mid point of the longitudinal center line of the front unit. The front unit body 251 of the illustrative vehicle A, like the rear unit body 21, is box-like and is of welded plate construction. Each of the front unit support wheels 300, 301, 302 and 303 is mounted on a well known ball-joint type of mounting structure. This independent wheel suspension is not, however, a feature of the invention, and a dual, through-axle or other suitable construction may be employed for the front unit if preferred, and particularly in extremely heavy vehicles of the order of 25 tons such other types of wheel suspension may be preferable.

As illustrated, each front unit wheel suspension comprises a pair of vertically spaced "wishbone" type suspension members 252 and 253 (FIGS. 2 and 4) with the wide ends of each pair of the wishbone members pivotally mounted on a pair of longitudinally spaced support brackets 254 and 255. Both pairs of support brackets 254 and 255 are mounted on an outwardly sloping, lower portion 257 of the side plate 258 of the front unit body 251.

The outer or apex ends of each vertically superposed pair of "wishbone" suspension members 252 and 253 are connected by ball joints 259 and 260, respectively, to a pair of upper and lower bracket portions 261 and 262 (FIG. 4) provided therefor on a wheel hub support member 263. The axes of each pair of ball joints 259 and 260 are disposed, in accordance with usual front wheel "geometry," to provide required alignment characteristics for each of the front unit wheels. These steering and alignment characteristics include the usual castor, camber and king pin inclination, and usually a slight amount of toe-in when the vehicle is at rest.

Independent spring suspension for each of the dirigible support wheels 300, 301, 302, and 303 of the front unit 250 is provided by a conventional coil spring 264, mounted in compression between the body bottom plate 265 and an inward extension of each upper "wishbone" member 252.

*Drive mechanism, front unit.*—Each axle 304 (FIG. 2) of each of the four dirigible wheels of the front unit 250 is in driving connection with its associated support wheel, and has a universal joint 305 on its inner end. The center of universal movement of each universal joint 305 is in accordance with standard automotive practice, on the line joining the centers of pivotal movement of the ball joints 259 and 260 on the apex ends of each upper and lower pair of "wishbone" members 252 and 253 to the wheel hub support member 263.

A telescoping shaft 307 operatively connects the universal joint 305 of each wheel axle 304 to a universal joint 308 mounted with its center of pivotal movement on the plane defined by the axes of pivotal movement of the inner ends of the associate upper and lower "wishbones" 252 and 253. Each universal joint 308 is also connected to a shaft 309, the inner end of which has universal joint connection with one of two differential gear units, one of which is provided for each laterally opposite pairs of wheels on the front unit 250.

Tturning now to the other, or engine end of the front unit drive mechanism, an internal combustion engine 310 is mounted in the front unit body 251 and drives a transversely extending shaft 311 through a right angle gear drive mechanism 312. The shaft 311 in turn drives a conventional automatic transmission 313 through a second right angle drive mechanism 314. The power output end of the automatic transmission 313 is coupled to a gear box 315. The power output end of the gear box 315 is coupled to a front differential gear unit 317, and the latter is connected by a shaft 318, having universal joints 319 and 320 at the ends thereof, to a rear differential gear unit 321.

*Steering.*—As mentioned previously herein, the vehicle A preferably is steered by a combined pivotal movement of the steering fork 200 and by turning the dirigible wheels of the front unit 250 about their respective axes of ball joint suspension. In accordance with common practice, the latter axes are referred to as "king pin axes," although obviously in a ball joint suspension no actual king pins are present. Also, the so called "geometry" of the front wheels is such that when the wheels are turned for steering in one direction or the other, each wheel which is on the outside of such turn will toe out relative to the wheel laterally opposite thereto in properly proportioned and increasingly greater amounts as the wheels are turned from their straight ahead position, so that the outermost wheel of such turn will have a larger turning radius than the innermost wheel. This toeing out of the wheels is so proportioned that the planes of both inner and outer wheels will at all times be substantially perpendicular to their respective turning radii, and thus will roll into the turn without inducing lateral tread slippage of either wheel.

Numerous vehicles have been designed, and the design data therefor is readily available, wherein two pairs of longitudinally offset, individually dirigible front wheels are provided. This arrangement is commonly referred to as a "dual-front end" structure, and is employed, for example, in some large and heavy truck-crane mechanisms.

Turning now to the diagram of FIG. 11, a steering wheel 351 is mounted in a driver's compartment provided in the rear unit 20, and is connected by a lever arm 352 to a front cable loop 353 and rear cable loop 354. The front cable loop 353 is connected to the rear end of a valve control lever 355 fulcrumed on a bracket 356 secured to the forward unit body 251.

The forward end of the valve control lever 355 is operatively connected to a conventional power steering control unit 357 of a suitable or well known type, and the latter is operatively connected to an extension 359a of the steering arm 359 of the left hand rear wheel 302, so that when the steering wheel 351 is turned toward the right the rear pair or dirigible wheels 302 and 303 are correspondingly turned toward the right, and vice versa. A transverse link 358 interconnects the inner ends of the steering arms 359 and 360 of the rear pair of dirigible wheels 302 and 303, while a longitudinally extending link 361 interconnects the steering arms 359 and 364 of the two left hand wheels 300 and 302.

A compensating bell crank lever 362 has one arm 362a thereof pivotally connected to the longitudinal link 361, and is mounted for pivotal movement on a bracket 363 on the front unit body 251. The second arm 362b of the bell crank lever 362 is operatively connected to a forward power steering unit 365, which may be similar to the first one 357, so that on a predetermined turning movement of the rear pair wheels 302 and 303, a compensating turning movement of the forward pair of wheels 300 and 301 will be caused by the actuation of the forward power steering unit 365 by the bell crank lever 362. In this manner the front wheels 300 and 301, which are more remote from the axis of turning movement of the front unit 250, i.e., the axis 202 of the fork mounting pivot pin 201, will be turned through required greater angles than will the rear pair of wheels 302 and 303.

The proportionate turning movement between the two pairs of wheels is such as to maintain all four of these dirigible wheels substantially perpendicular to their turning radii at all times within their limits of turning movement. The amount of compensation required will obviously vary with differences in design characteristics of a vehicle embodying the invention, and employing a dual dirigible front wheel construction.

The rear control cable loop 354 is connected to a control lever 367 (FIG. 11) pivotally mounted on a bracket 368, which is mounted at any convenient point of the vehicle A, for example, within or upon the transverse upper portion 205 of the steering fork 200.

The other end of the control lever 367 is operatively connected to a power steering mechanism 369 which controls the hydraulic cylinder 213, which in turn controls the steering fork 200. The power steering mechanism 369 has a rod 370 projecting therefrom and which moves axially with the power steering mechanism. A head member 370a is secured to its outer end of this rod. A compensating control lever 371 has an apertured end portion 372 mounted for axial slidable movement on the rod 370, and is biased toward a centered position thereon by two coil compression springs 373 and 374. A control cable 375 is operatively connected between the spring biased lever 371 and the steering fork 200.

Should the steering fork assume a turned position not compatible with the turned position of the front wheels 300, 301, 302 and 303, as for example by being subjected to severe transverse or other stresses, the power steering mechanism 369 is actuated to urge the steering fork 200 toward a conforming condition. In other words if the front unit 250 is "jammed" or placed in a position which is incompatible with the front wheels, the cylinder 213 would also be maintained in a more or less fixed or jammed position. This would, in turn, cause the control lever 371 to be jammed. In order to maintain some degree of steerability through the dirigibility of the front wheels, the springs 373 and 374 have been provided on the elongated rod 370, thus allowing a "leeway" for movement of the power steering mechanism 369 which enables the rod 370 to move when the wheel 351 is turned. This allows the front loop 353 to be operated and to "override" the jammed condition of the front unit. The crux of this over-ride system resides in the provision of an elongated rod 370 and the springs 373 and 374 thereon.

*Summary.*—The present invention provides a vehicle which is capable of high speeds on a highway, or on any reasonable smooth, hard surfaced terrain, and also of operating and maneuvering at comparative high speeds over extremely rough or unobstructed terrain, including some types of terrain over which no known type of prior vehicle has been able to operate. Although illustrated with dual dirigible front unit wheels, it is obvious that these wheels are not necessarily individually dirigible, but in the case of a vehicle which will be used for only limited travel, as for example a big gun carriage, which is transported by a suitable carrier vehicle to approximately its desired point of use, of an extremely heavy crane, which also is not intended for substantial maneuvering, the front unit wheels may be of non-dirigible construction, which is generally referred to as "quad" construction.

Also, in a small vehicle such as a small reconnaissance vehicle, or one for use by hunters and other sportsmen, the dual wheel structure may be omitted and a single pair of front wheels may be provided, as for example, one wheel on the lower end of each arm of the steering fork. Such single front wheels can be either dirigible or not, and either power driven or not, at the election of the designer of an individual model.

Having thus described the invention, what we claim as new and desire to protect by Letters Patent is defined in the following claims:

1. An articulated vehicle comprising:
   a rear unit supported by at least two laterally opposite and longitudinally separated pairs of wheels,
   a front unit,
   two latetrally opposite and longitudinally separated pairs of wheels supporting said front unit, at least the forward pair of said wheels being dirigible,
   an elongated bearing mounted on the forward portion of said rear unit with its axis extending lengthwise of said unit,
   a roll tube and steering fork attachment fitting journaled to said bearing,
   a steering fork consisting of a transverse portion having two forwardly and downwardly extending tines,
   means pivotly connecting the transverse portion of the steering fork to said fitting for pivotal movement relative to said fitting about a vertical axis which is substantially coplanar with the longitudinal axis of said bearing,
   means pivotly mounting the front unit substantially between said tines for free-acting, automatic, pitch adjustment of said front unit relative to said steering fork and said rear unit as said vehicle encounters variable terrain,
   and steering means intercoordinating the dirigible wheels on said front unit and the pivoting of said front unit and said steering fork.

2. An articulated vehicle as claimed in claim 1 wherein all of the wheels on said vehicle are powered, and in which the rear wheels are mounted, two on each side of said rear unit, at the ends of walking beams.

3. A vehicle as claimed in claim 2 in which said walking beams are each suspended at substantially their center points to said rear unit by hydraulic cylinders which are coaxially mounted within spring members whereby said walking beams may be individually positioned to raise and lower the rear unit.

4. An articulated vehicle comprising
   a rear unit,
   vehicular means supporting said rear unit,
   a front unit longitudinally displaced from said rear unit,
   two laterally opposite and longitudinally separated pairs of wheels supporting said front unit,
   an elongated bearing mounted on the forward portion of said rear unit with its axis extending longitudinally of said unit,
   a roll tube and steering fork attachment fitting coaxially journaled in said bearing and adapted to roll about the longitudinal axis of said bearing,
   a steering fork attached to said fitting and adapted to pivot about a yaw axis which is coplanar with said longitudinal axis and in which said yaw axis is in front of the forwardmost portion of said rear unit, the tines of said steering fork extending forwardly and downwardly with respect to the point of intersection of said yaw and longitudinal axes,
   said front unit being journaled between the tines of said steering fork at a point near the ends of said tines whereby said front unit may freely and automatically rotate in pitch adjustment about the pitch axis extending through the ends of said tines, said pitch axis being located near the midpoint between the pairs of wheels supporting said front unit.

5. An articulated vehicle as claimed in claim 4 in which the axis line of the rear pair of wheels on said front unit is positioned substantially in the plane of and beneath said vertical yaw axis pivot connection.

6. An articulated vehicle as claimed in claim 4 in which said longitudinal axis lies in a horizontal plane which contains the geometric center lognitudinal line of said rear unit and in which the pitch axis of said front unit lies in a horizontal plane which is substantially below the geometric center line of said rear unit.

7. In an articulated vehicle comprising a rear unit supported by vehicular means and a front unit supported by at least one pair of dirigible wheels and wherein the front and rear units are adapted to rotate with respect to each other around a normally vertical yaw axis positioned substantially between said units, steering control means which comprises:
   a lever arm, a first cable loop and a second cable loop each attached to said lever arm,
a first control valve/hydraulic cylinder combination,
said first cable loop being attached to said first valve/hydraulic cylinder combination to control the output arm of said cylinder,
the output arm of said cylinder being attached to a steering arm which steers the dirigible wheels on said front unit,
a second control valve/hydraulic cylinder combination,
said second cable loop being attached to said second control valve and hydraulic cylinder combination,
said last mentioned cylinder being attached substantially between said front unit and said rear unit and being adapted to interact between said front and said rear units to cause them to rotate about said vertical axis,
said first and second cable loops being positioned so that, as said lever arm is actuated, said dirigible wheels are caused to steer in a selected direction and said front unit is simultaneously rotated about said yaw axis in the direction in which the wheels are directed.

8. An articulated vehicle comprising:
a rear unit body,
a pair of walking beams mounted one on each side of the rear unit body and extending longitudinally thereof,
a support wheel journaled on each end of each walking beam,
power drive means operatively connected to selected ones of the support wheels,
a steering fork comprising a transverse upper portion and two laterally spaced arms,
means mounting said transverse upper portion of said fork on a forward portion of the rear unit for pivotal movement about a roll axis extending lengthwise of the rear unit, and about a second axis substantially at right angles to said roll axis,
a front unit body,
means freely, pivotally mounting the front unit body on the ends of the laterally spaced arms of said steering fork for free-acting pitch movement of said front unit body relative to said fork and to said rear unit as said vehicle encounters variable terrain.
a plurality of support wheels journaled on the front unit body,
steering means operatively connected to the steering fork for urging the latter in a selected direction rotatively about the second axis,
at least the forward support wheels of the front unit being dirigible, and
steering means operatively connected to steer such dirigible front wheels in coordination with the steering fork.

9. An articulated vehicle comprising:
a rear unit body,
a pair of walking beams mounted one on each side of the rear unit body and extending longitudinally thereof,
a support wheel journaled on each end of each walking beam,
power drive means operatively connected to selected ones of the support wheels,
a steering fork comprising a transverse upper portion and two laterally spaced arms
means mounting the base member of said fork on a forward portion of the rear unit for pivotal movement about a longitudinal roll axis extending lengthwise of the rear unit, and about a second axis substantially at right angles to the roll axis,
a front unit body trunnioned between the free ends of the steering fork arms,
a plurality of support wheels journaled on the front unit body,
steering means operatively connected to the steering fork for urging the latter in a selected direction rotatively about said second axis,
said longitudinal roll axis being located in the horizontal plane which contains the longitudinal geometric center line of said rear unit,
the pitch axis of said front unit lying in a horizontal plane which is substantially below said longitudinal geometric center line of said rear unit and located approximately at the midpoint between the pairs of wheels supporting said front unit.

10. An articulated vehicle comprising:
a front unit,
two laterally opposite and longitudinally separated pairs of wheels supporting the front unit,
a rear unit,
two laterally opposite and longitudinally separated pairs of wheels supporting the rear unit,
the entire front unit including all four of the wheels mounted thereon acting as an entity, and the wheels supporting the rear unit being mounted, respectively, for substantial pitch movement relative to the rear unit and relative to each other, and
means pivotally interconnecting the front and rear units for relative twisting movement of the two units about a roll axis extending longitudinally of the vehicle.

11. An articulated vehicle as claimed in claim 10 which includes means which provide pivotal rotation of said front unit including the wheels mounted thereon relative to said rear unit around a normally vertical yaw axis positioned between said units.

12. An articulated vehicle comprising:
a rear unit supported by at least two laterally opposite and longitudinally separated pairs of wheels,
a front unit,
vehicular support means on said front unit,
an elongated bearing mounted on the front end of said rear unit with its axis extending lengthwise of said rear unit,
a roll fitting journaled to the bearing,
a steering fork,
means pivotally connecting the base end of the steering fork to the roll fitting for pivotal movement relative to said roll fitting about a vertical axis which is substantially at right angles to the axis of the bearing, and
means freely, pivotally, mounting the front unit on the other end of the steering fork for free acting, pitch movement relative to the fork and to said rear unit as said vehicle encounters variable terrain.

13. An articulated vehicle as claimed in claim 12 and which includes:
steering means operatively connecting the steering fork to said roll fitting.

14. An articulated vehicle comprising:
a front unit supported by at least two laterally opposite and longitudinally separated pairs of wheels,
a wheel supported near unit,
a roll tube and steering for attachment fitting journaled on the front end of the rear unit for rotative movement about a roll axis extending longitudinally of the rear unit,
a steering fork,
means connecting the base portion of the steering fork to said fitting for pivotal movement of the steering fork about an axis substantially at right angles to the roll axis of the fitting,
bearing means interconnecting the tines of the steering fork to the front unit to provide for pitch adjustment of the front unit relative to the steering fork,
force applying means acting between the fitting and a point on each side of the steering fork spaced from its connection to the fitting, steering means for selevtively controlling the force applying means to urge the steering fork in a selected direction about its connection to the fitting for steering purposes, said roll tube and steering fork attachment fitting comprising an elongated bearing portion which is journaled in the forward portion of the rear unit, a pair of arms extending laterally, one from each side of the fitting, forwardly of the bearing portion thereof, said force applying means operatively mounted between a laterally outward portion of each arm and one of the points on the steering fork which is operable by the steering means to exert a steering force on a selected one of the points on the fork, said force applying means comprising a pair of flexible tension members connected one between an outer portion of each arm and a corresponding point on the steering fork on each side of the steering fork axis, and a hydraulic cylinder means on said fork and engaging said tension members responsive to an operation of the steering means to tighten a selected one of the tension members and simultaneously to release the other tension member.

15. An articulated vehicle comprising:

a front unit supported by at least two laterally opposite and longitudinally separated pairs of wheels, a wheel supported rear unit, a roll tube and steering fork attachment fitting journaled on the front end of the rear unit for rotative movement about a roll axis extending longitudinally of the rear unit, a steering fork, means connecting the base portion of the steering fork to said fitting for pivotal movement of the steering fork about an axis substantially at right angles to the roll axis of the fitting, bearing means interconnecting the tines of the steering fork to the front unit to provide for pitch adjustment of the front unit relative to the steering fork, force applying means connected between the fitting and a point on each side of the steering fork spaced from its connection to the fitting, steering means for selectively controlling the force applying means to urge the steering fork in a selected direction about its connection to the fitting for steering purposes, said roll tube and steering fork attachment fitting comprising;

an elongated bearing portion which is journaled in the forward portion of the rear unit, a pair of arms extending laterally, one from each side of the fitting forwardly of the bearing portion thereof, said force applying means being operable by the steering means to exert a steering force on a selected one of the points on the fork, said fitting comprising;

said bearing portion including a shaft portion, said shaft portion journaled in the forward portion of the rear unit for rotative movement about an axis extending lengthwise of the rear unit, an integral forward portion on said fitting which projects forwardly beyond the rear unit, the oppositely extending arms projecting laterally, one on each side of the forwardly projecting portion of the fitting, said force applying means comprising;

a pair of flexible steering chains, one end of each of which is connected to an outer portion of one of the arms, the other end of each chain being connected to a corresponding point on the steering fork on each side of the steering fork axis and a hydraulic cylinder having two oppositely directed portions mounted on said fork with one of said portions in operative engagement with each of the chains to tighten a selected one of the chains and simultaneously to release the other chain upon an actuation of the cylinder in a selected direction.

16. an articulated vehicle comprising:

a rear unit body, a pair of walking beams mounted one on each side of the rear unit body and extending longitudinally thereof, a support wheel journaled on each end of each walking beam, power drive means operatively connected to selected ones of the support wheels, a roll bearing and steering fork attachment fitting mounted on the front end of the rear unit body for pivotal movement about an axis extending lengthwise of the rear unit body, a steering fork comprising a transverse upper portion and two laterally spaced arms, a pivot pin pivotally connecting the transverse upper portion of the steering fork to a forward portion of the fitting, a front unit body trunnioned between the free ends of the steering fork arms, two laterally opposite and longitudinally separated pairs of support wheels journaled on the front unit body, at least the forward pair of said support wheels of said front unit being dirigible, said front body being free to automatically pitch relative to said steering fork arms and said rear unit body, and steering means operatively connected to the steering fork for urging the latter in a selected direction rotatively about the pivot pin, said steering means being operatively interconnected to steer said dirigible front wheels in coordination with the steering fork.

17. An articulated vehicle comprising:

a rear unit body, a pair of walking beams mounted one on each side of the rear unit body and extending longitudinally thereof, a support wheel journaled on each end of each walking beam, power drive means operatively connected to selected ones of the support wheels, said walking beams being pivotally connected substantially medially of their length to the piston of a hydraulic cylinder, each such hydraulic cylinder being resiliently mounted in an axially upright position by a support spring on its respective side of the rear unit body, whereby an extension of the pistons elevates the body to increase ground clearance, a roll bearing and steering fork attachment fitting mounted on the front end of the rear unit body for pivotal movement about an axis extending lengthwise of the rear unit body, a steering fork comprising a transverse upper portion and two laterally spaced arms, a pivot pin pivotally connecting the transverse upper portion of the steering fork to a forward portion of the fitting, a front unit body trunnioned between the free ends of the steering fork arms, two laterally opposite and longitudinally separated pairs of support wheels journaled on the front unit body, said front body being free to automatically pitch relative to said steering fork and to said rear unit body, and steering means operatively connected to the steering fork for urging the latter in a selected direction rotatively about the pivot pin.

18. An articulated vehicle as claimed in claim 17 in which said rear unit body support wheels are mounted in laterally opposite pairs with the wheels of at least one laterally opposite pair being operatively connected through a differential gear mechanism and a transmission mechanism to a power source.

19. An articulated vehicle comprising:
   a wheel supported rear unit,
   a front unit body,
   at least two laterally opposite and longitudinally separated pairs of support wheels journaled on the front unit body,
   at least the two forward support wheels on the front unit body being dirigible,
   a roll tube and steering fork attachment fitting journaled on the front end of the rear unit for pivotal movement about an axis extending lengthwise of the rear unit and projecting forwardly therefrom,
   a pivot pin on a forward portion of the fitting with its axis substantially upight when the vehicle is supported on a flat, horizontal surface,
   a steering fork pivotally mounted on said pivot pin and spanning a portion of the front unit body,
   bearing means providing trunnion mounting for the front unit body within the steering fork, said front unit body being free to automatically pitch relative to said fork as said body encounters uneven terrain,
   steering means operatively connecting the steering fork to the fitting, said steering means being divided into two portions, one of said portions controlling turning of the steering fork with the front unit trunnioned thereon about the axis of the pivot pin, and the other of said portions controlling dirigible steering of the wheels of the front unit.

20. An articulated vehicle as claimed in claim 19 which includes
   a sensing member mounted in one portion of the steering means, said sensing member being operatively connected to the steering means to sense relative steering conditions of the steering fork and at least one of the dirigible front wheels, the portion of the steering means which controls turning of the steering fork about the axis of the pivot pin being responsive to the sensing means so as to be subservient to the portion of the steering means which controls dirigible turning of the wheels of the front unit.

References Cited
UNITED STATES PATENTS

| | | | |
|---|---|---|---|
| 2,156,601 | 5/1939 | Mosling et al. | 280—91 |
| 2,219,533 | 10/1940 | Ross | 150—51 |
| 2,362,262 | 11/1944 | French | 180—79.2 |
| 2,742,100 | 4/1956 | Rockwell | 180—79.2 |
| 2,827,715 | 3/1958 | Wagner | 180—51 |
| 2,936,037 | 5/1960 | Anderson | 180—79.2 |
| 3,016,987 | 1/1962 | Williamson | 180—50 X |
| 3,183,991 | 5/1965 | Gamaunt | 180—24 |
| 3,253,671 | 5/1966 | Fielding | 180—51 |

FOREIGN PATENTS

| | | |
|---|---|---|
| 919,536 | 2/1963 | Great Britain. |

A. HARRY LEVY, *Primary Examiner.*